Nov. 29, 1960   J. F. MENKE   2,961,963
ELECTRICAL FUSES FOR MISSILES, PARTICULARLY ROCKET MISSILES
Filed May 24, 1956   4 Sheets-Sheet 4
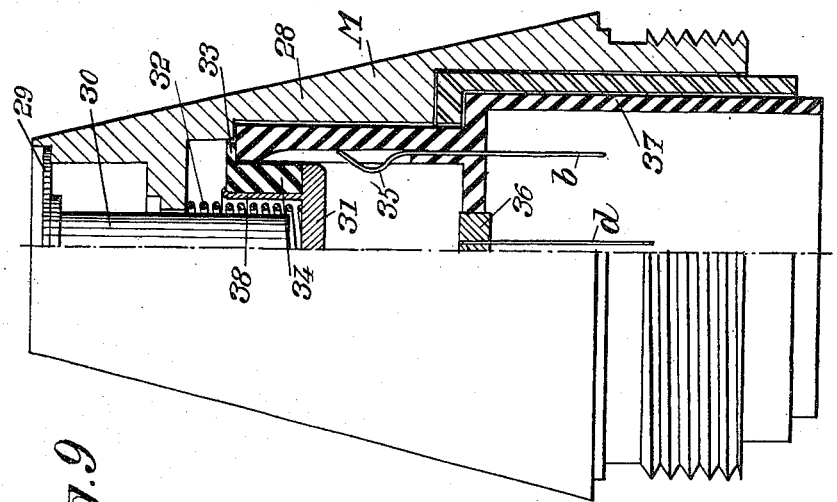
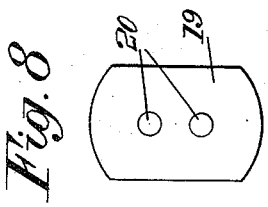
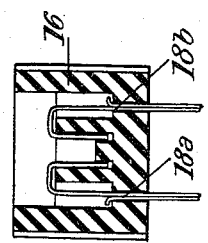
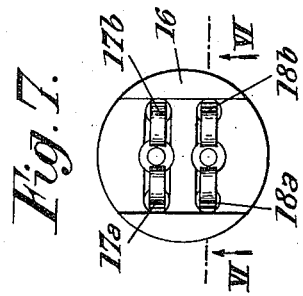
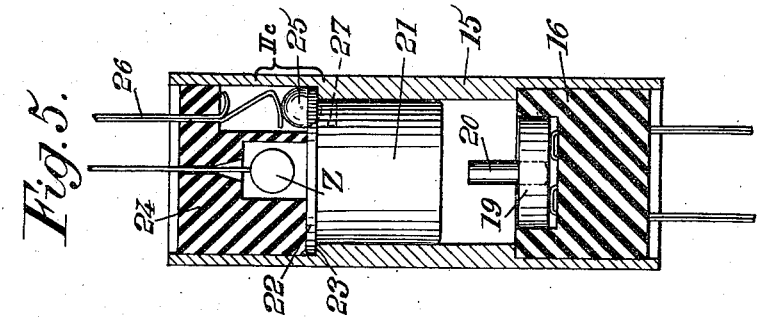

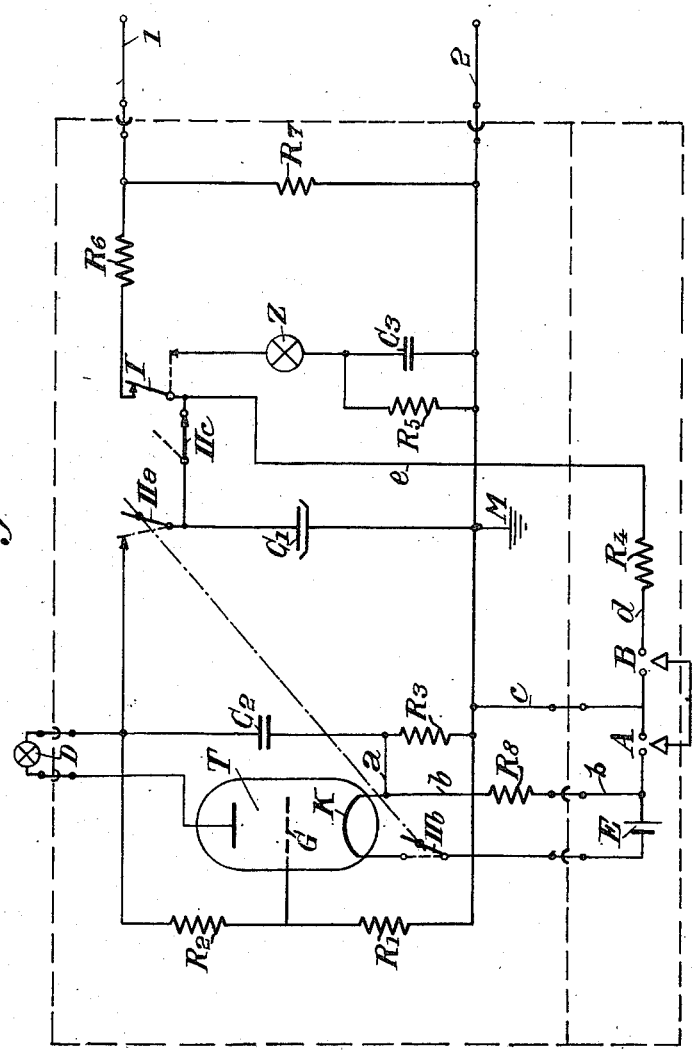

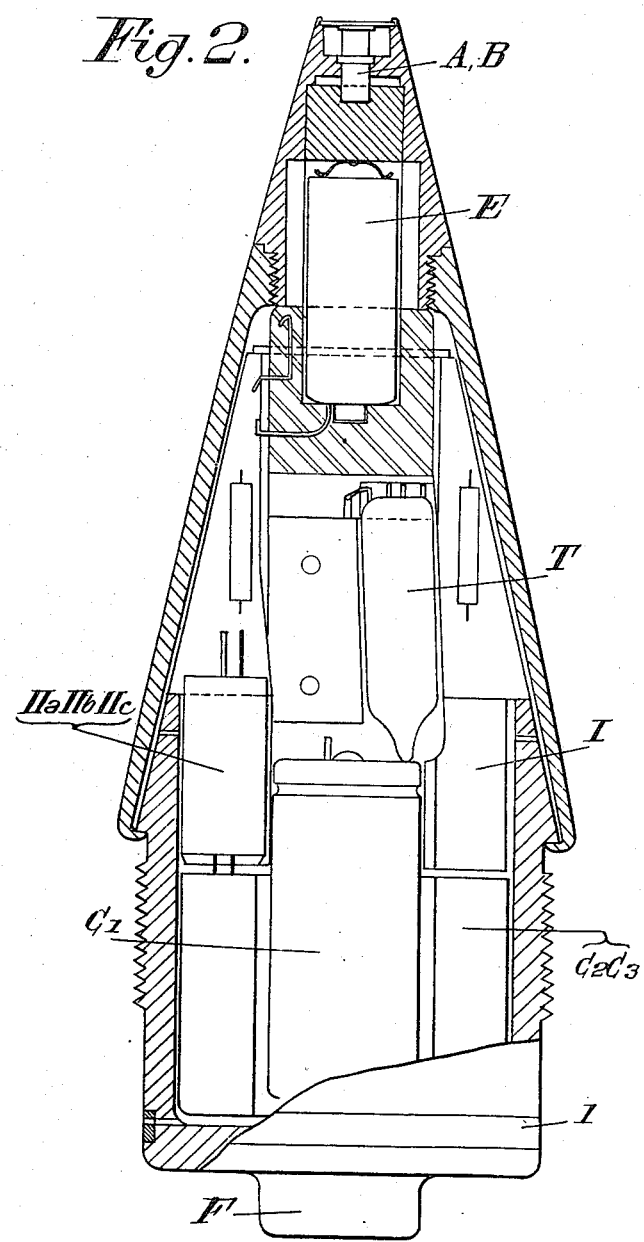

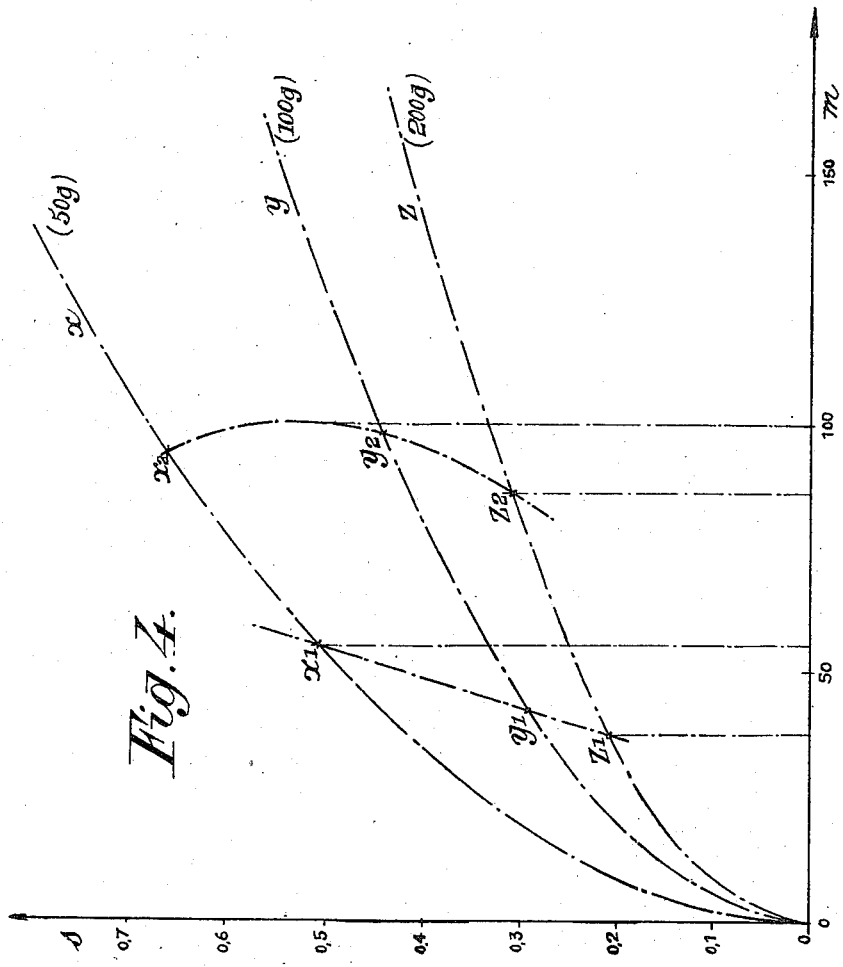
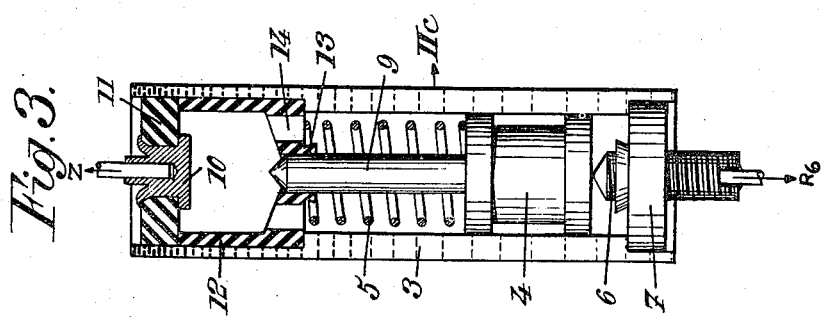

United States Patent Office 2,961,963
Patented Nov. 29, 1960

2,961,963

ELECTRICAL FUSES FOR MISSILES, PARTICULARLY ROCKET MISSILES

Joseph Ferdinand Menke, Zurich, Switzerland, assignor to Company Brinro Limited, Tangiers, a society of Tangiers Filed May 24, 1956, Ser. No. 587,141

Claims priority, application Luxembourg June 1, 1955

10 Claims. (Cl. 102—70.2)

The invention relates to electrical fuses for missiles, particularly for rocket missiles.

It is known in missiles having electrical fuses, to charge, during the firing cycle (i.e. just before or at the instant the missile is fired) a storage condenser disposed on board the missile, this condenser being connected, after the missile has been fired, to internal firing circuits which produce the explosion of the detonator at the moment that an impulse (from a firing pin or the like) is effective to bring the fuse into operation.

An inertia switch is provided between the storage condenser and the internal fuse circuits which, as a result of the forces of inertia occurring during the firing of the missile, is moved from an initial position, in which it connects to the storage condenser an external circuit for charging this condenser, into a final position, in which it causes or at least prepares the connection of the storage condenser to the internal firing circuits.

If the usual inertia switch is used in connection with the rocket missiles, "safe flight" distances (i.e. the distance through which the missile travels before the detonator is armed by the inertia switch reaching its final position) are obtained which depend on the prevailing external temperature, since the initial acceleration of the rocket depends greatly on this external temperature.

One object of the present invention is to provide an electrical fuse which is particularly suitable for rocket missiles and which enables a predetermined "safe flight" distance to be achieved or closely approached under widely differing conditions of external temperature. Thus from one aspect the present invention provides an electrical fuse for a missile, comprising a storage condenser adapted to be charged during the firing cycle of the missile and to be connected to internal firing circuits by an inertia switch during the initial flight path of the missile, characterised in that said inertia switch comprises a movable member in the form of a piston arranged in a cylinder containing a fluid the viscosity of which is substantially constant over the temperature range within which a substantially constant "safe flight" distance is required. A silicone oil is a particularly suitable fluid for this purpose.

The invention also provides an arrangement in which the inertia switch does not directly effect the connection of the storage condenser to the internal firing circuits, but first causes a small proportion of the charge stored in the condenser to operate a second switch, referred to hereinafter as the main switch, this main switch in turn connecting the storage condenser to the internal firing circuits and thus arming the fuse. Preferably the operation of this main switch is not only followed by the arming of the fuse, but at the same time also causes the opening of the charging circuit of the storage condenser by means of an auxiliary switch which is in series with the said inertia switch on a corresponding member. Thus, should the main switch prematurely move into the position in which it connects the storage condenser to the internal firing circuits, by chance or accidentally, the connection of the storage condenser to the external circuit serving to charge it is simultaneously broken so that the storage condenser cannot be charged and an accident before firing the missile is positively prevented, since no electrical energy is available which could explode the detonator of the fuse. As regards the internal firing circuits, these conveniently include a thyratron connected in series with the detonator, which includes a primer, so that the detonator is exploded at the instant the thyratron becomes conductive. Means including a firing pin or the like is provided for causing the thyratron to become conductive upon impact and circuit means is provided to cause the condenser to be discharged through the detonator if there is no impact after a predetermined period of time.

When the fuse is of the impact type, in accordance with a further feature of the invention this fuse is provided with two sets of contacts which are adapted to be closed by the striker element, one of these sets of contacts controlling the circuit in which the detonator is connected and causing the explosion of the missile by its closure in consequence of the missile hitting the target, whilst the second is incorporated in the circuit of the charging condenser and discharges the latter, or at any rate prevents it being charged, if this second contact is closed by the striker element before the main switch is brought into the position corresponding to the arming of the fuse.

Consequently the storage condenser cannot be charged, or is unable to retain its charge, when the striker element is forced in as a result of damage to the striker assembly before firing the missile or during the "safe flight" distance.

The invention is more fully explained by way of example in the accompanying drawings, in which:

Figure 1 is a wiring diagram of an electrical fuse in accordance with the invention;

Figure 2 illustrates, diagrammatically and in section through the housing of the fuse, the assembly of the parts constituting this fuse;

Figure 3 shows, in axial section, an inertia switch in accordance with the invention;

Figure 4 is a diagram explaining the effect produced by the inertia switch of Figure 3;

Figure 5 is an axial section through a main switch constructed in accordance with the invention, the operation of which arms the missile;

Figures 6 and 7 illustrate a detail of the switch of Figure 5, respectively in section on the line VI—VI of Figure 7 and in plan;

Figure 8 is a plan of a further detail of the switch of Figure 5; and

Figure 9 illustrates, partly in side view and partly in section, the tip of the fuse in which the striker body and the switch parts operated thereby are arranged.

Figures 2, 3 and 5 to 9 are shown on a greatly enlarged scale.

In Figure 1, $C_1$ is the storage condenser of the fuse which is charged from the exterior during the firing cycle, i.e. shortly before firing or at the instant of firing. The conductor for the charging current, which for example leads out of the missile at its rear end or at its bottom, is designated 1, whilst the return conductor 2 goes through the body. Connected in series in the charging circuit of the condenser $C_1$ are an inertia switch I, an auxiliary switch IIc and a high value resistance $R_6$, the resistance of which is of the order of several hundred thousand ohms. The resistance $R_6$ may be replaced by a rectifier tube (selenium or copper oxide-rectifier, germanium diode or glow lamp). The resistance $R_6$ or the rectifier tube is intended to prevent a detrimental discharge of the precharged condenser $C_1$ as a result of any short circuit at the moment the rocket is fired.

In addition a larger resistance $R_7$, with a resistance of the order of 10 megohms, is connected in parallel with the condenser $C_1$. The function of this resistance $R_7$ is to make an undesired static charging of the condenser, which might otherwise occur if the fuse were located in a strong electric field for any reason, impossible.

The inertia switch I, the construction of which is described in more detail below, is a switch which closes the charging circuit in the initial position illustrated in full lines in Figure 1 but, after firing, passes, with a certain delay, into the final position illustrated in dotted lines in which it opens the charging circuit and instead arms the fuse in the manner which is described below. The auxiliary switch IIc is also in the closed condition during the charging of condenser $C_1$, whereas it is opened during the arming of the fuse.

To arm the fuse a switch IIa is first closed, such closure connecting the storage condenser $C_1$ to the internal firing circuits. Moreover the switch IIb is closed to arm the fuse, this switch being incorporated in the heating circuit of the cathode K of a thyratron T which controls the passage of electrical current to the detonator D. This heating circuit is supplied from a battery E.

A main switch is used to operate the switches IIa and IIb and advantageously for simultaneous operation of the switch IIc, this main switch being operated as a result of the switch member of the switch I passing from its initial position to its second position.

As a result of the switch I assuming its final position, any suitable means can be operated to actuate the said main switch. It has however been found particularly advantageous to use a primer Z for operating the main switch, this primer exploding when the current passes and thereby moving the switch member or members of the main switch IIa, IIb, IIc from the positions illustrated in Figure 1 in full lines into those illustrated in dotted lines, and simultaneously interrupting its own circuit.

The primer Z is connected through the previously mentioned auxiliary switch IIc, arranged in the charging circuit of the storage condenser $C_1$, to the storage condenser $C_1$, a condenser $C_3$ being in series with the primer. As soon as the switch I has reached the final position indicated in dotted lines, the current from the condenser $C_1$ flowing through the primer Z explodes the latter, as a result of which the main switch is operated in the manner described. The condenser $C_3$ connected in series with the primer Z has the effect of preventing a short circuit of the charging condenser $C_1$, to which it is connected whilst practically entirely discharged, and of limiting the amount of current which is supplied from the condenser $C_1$ into the circuit of the primer Z to a comparatively small value so that no substantial quantity of current is taken from the condenser $C_1$ by the operation of the primer. To this end, the capacity of $C_3$ is only very small in relation to that of $C_1$. It is to be noted that the capacities of $C_1$ and $C_3$ differ by about a factor of ten or more. In a practical embodiment of the invention, the capacity of $C_1$ is 10 μf. and the capacity of $C_3$ is 0.2 μf.

After the primer Z is exploded, all current supply from $C_1$ to Z is completely cut off since not only is the switch IIc opened, but at the same time the primer Z has interrupted its own circuit.

Advantageously a high value resistance $R_5$ is connected in parallel with the condenser $C_3$. This has the function of preventing a static charging of the condenser $C_3$, or a charging occasioned by a failure of insulation, thereby to guarantee that current actually flows from $C_1$ to $C_3$ at the instant the switch I reaches its final position.

As already stated, the storage condenser is connected to the internal firing circuits, so as to be able to feed current thereto, by closure of the switch IIa. The circuits made after closure of the switch IIa, as is evident from Figure 1 are as follows:

One terminal or the cover of the storage condenser $C_1$, which is grounded at M, is connected through the resistance $R_3$ and the conductor a to the cathode K of the thyratron T. Moreover, after closure of the switch IIa a closed circuit is made comprising, in series, the storage condenser $C_1$, the said resistance $R_3$ and an auxiliary condenser $C_2$. This auxiliary condenser $C_2$ is therefore charged by the storage condenser $C_1$, starting from the instant that the switch IIa closes, and this charging is slowed down a certain amount by the inserted resistance $R_3$.

Moreover the auxiliary condenser $C_2$ is included in a circuit which includes, in series, the detonator D and the thyratron T, so that the auxiliary condenser can discharge into the primer of the detonator when the thyratron T becomes conductive. When the thyratron becomes conductive, the storage condenser $C_1$ can moreover discharge into the primer of the detonator D if a shunt, short-circuiting the resistance $R_3$ and consisting of the conductors c and b and containing the contacts A, is closed. The contacts A are controlled by the element initiating the fuse, for example a striker pin.

The passage of current through the thyratron T is dependent on the difference between the potential of the grid G of the thyratron and the potential of the cathode K of this thyratron. As long as K has a substantially more positive potential than G, conduction of the thyratron is suppressed. The potential of the grid G relatively to earth M can be adjusted in various ways: the potential of G, which for example may be about 10 volts more than earth potential, may, if no very great precision is required, be adjusted by connecting the grid to earth through a resistance. Greater precision in the adjustment of the potential of the grid G can be secured if use is made (see Figure 1) of a voltage divider incorporating two resistances $R_1$ and $R_2$, this voltage divider being connected to the terminal of the storage condenser $C_1$ after closure of the switch IIa.

The operation of the connections described is as follows:

When the missile meets a target, the contacts A are closed and as a result the cathode of the thyratron T is connected directly to earth through the conductors b and c, short circuiting the resistance $R_3$, whereby the thyratron immediately becomes conducting. Consequently the storage condenser $C_1$ (through the contacts A and the thyratron) and also the auxiliary condenser $C_2$ (through the thyratron), can discharge into the detonator and explode the latter.

If, in contrast, the missile misses the target, the missile destroys itself after a certain pre-set period determined by the time constant of the assembly formed by the auxiliary condenser $C_2$ and the resistance $R_3$. If contacts A are not closed in a predetermined time, the storage condenser $C_1$ gradually charges the auxiliary condenser $C_2$, this involving a corresponding lowering of the potential of the cathode K of the thyratron. When this cathode potential has fallen sufficiently, the thyratron becomes conducting at a specific instant corresponding to the ignition characteristic thereof, and the auxiliary condenser $C_2$ discharges into the detonator to explode the latter. In practice only the current stored in the condenser $C_2$ is involved in the self-destruction of the missile since the resistance $R_3$, which is not short circuited in this case, prevents rapid discharge of the storage condenser into the detonator D despite the fact that the thyratron has become conductive.

In many instances it is advantageous, even after operating the initiating contacts A of the fuse, to slightly delay the explosion of the detonator D, and this can be performed by incorporating a resistance $R_8$ in the short circuit conductors b, c, the value of this resistance being, of course, substantially smaller than that of the resistance $R_3$.

As arises from the foregoing, the same condenser $C_2$ is used both to supply the current for exploding the detonator, and also as a condenser which, together with the resistance $R_3$, determines the length of the period at the end of which the self-destruction of the missile takes place.

In the event that the fuse-initiating element is a striker pin, in accordance with a further feature of the invention there is associated with this striker not only contacts A which close the short circuit connection $b$, $c$, but also second contacts B which are incorporated in a conductor chain $c$, $d$, $e$ which is in parallel with the charging circuit of the storage condenser $C_1$ and is capable of short circuiting the condenser. It is to be noted that this chain of connections may only bring about short circuiting of the condenser $C_1$ if not only the contacts B but also simultaneously the aforesaid switch IIc are closed.

$R_4$ is a protective short-circuit current-limiting resistance which is inserted in the conductor chain $c$, $d$, $e$, but is not absolutely essential.

The contacts B have the function, when closed, e.g. as a result of damage to the striker pin of the fuse, of preventing charging of the storage condenser $C_1$, or, if this damage should occur after the charging of the storage condenser, but before the missile has reached the end of its "safe flight" path of harmlessly discharging this condenser.

As stated, the closure of the auxiliary contacts B can have the aforesaid effect only so long as the switch IIc is closed; this latter switch, however, opens as soon as the fuse is armed.

Furthermore, the switch IIc has the effect of entirely preventing charging of the storage condenser $C_1$ if the primer Z has been accidentally exploded before the missile is fired, as a result of which the switch IIc has been opened.

Figure 2 is a diagrammatic section through the fuse which is housed in the tip of the missile, and the individual parts of the fuse which have been disclosed in connection with the description of Figure 1 have been indicated with the same reference letters as in Figure 1. It is mentioned that the storage condenser $C_1$, which is of relatively large capacity, may be in the form of an electrolytic condenser or a metallic paper condenser, whilst the condensers $C_2$ and $C_3$ of smaller capacity may be paper condensers and provided in a common vessel which, therefore, contains a double condenser. The holder for the detonator D, which is not itself actually illustrated, is indicated at F at the lower end of the structure seen in Figure 2.

Figure 3 illustrates the detail construction of the inertia switch I which has already been referred to above in relation to its connections and operation. This figure shows that the inertia switch has an external metallic tube 3 with its outer wall in conductive connection with the storage condenser $C_1$ through the switch IIc. A movable piston 4 is disposed inside the tube, this representing the movable switch member and being applied by a spring 5 against a contact 6 connected to the charging lead 1 and screwed with threading into a bottom piece 7 of insulating material. The insulated element 7 is inserted in tightly sealed fashion into the lower end of the tube 3 and insulates the contact 6 from the tube 3.

The piston 4 forming the movable switch member is provided at its upper side with a contact pin 9 which, when the piston 4 moves upwards, engages a contact element 10 which is inserted in a plate 11 of insulating material closing the upper end of the tube 3. This contact element is in conducting connection with the primer Z. Provided below the plate 11 inside the tube 3 is an insulated insert body 12, the base of which is perforated in the middle and carries a guide ring 13 for the contact pin 9. The base, which also has holes 14 laterally of the guide ring 13, constitutes the bearing for the upper end of the spring 5.

In accordance with the invention, the interior of the tube 3 is filled with a liquid having a viscosity which is independent of the temperature and which exerts the necessary braking effect on the piston when the latter moves from its initial position (that illustrated in Figure 3) into its final position in which the contact pin 9 is applied against the contact element 10. Advantageously silicone oil is used as the braking fluid.

When the parts of the switch I illustrated in Figure 3 are in the position illustrated in this figure, the charging lead 1 is connected to the storage condenser $C_1$, this lead being, however, separated from the primer Z. In contrast, however, the charging connection 1 is interrupted when the piston 4 is in its opposite end position, and instead the condenser $C_1$ is connected to Z.

The diagram of Figure 4 explains the operation of the inertia switch described above, this switch, as above stated, ensuring that the "safe flight" distance remains, in practice, substantially unchanged irrespective of the external temperature. This distance depends on the setting of the initial loading of the spring, this being adjustable by screwing the contact 6, against which the piston bears in its initial position, to a greater or lesser depth into the cylinder 3, on the characteristic of the spring, the viscosity of the fluid, the clearance between the piston 4 and the cylinder 3, the mass of the piston 4, the length of the path of this piston between its initial and final positions, and so on. By appropriate regulation of these factors the "safe flight" distance may be accurately set as required.

In the diagram of Figure 4, the abscissae represent "safe flight" distances in metres (m), whilst the ordinates give the time in seconds (s) taken to travel this distance. Three curves $x$, $y$, $z$ are indicated in this diagram, these representing the distance-time-diagram of a rocket missile for three different temperature conditions. The first curve ($x$) applies when there is an external temperature of minus 25° centigrade, the assumption being made that the initial acceleration is about 50 $g$. The second curve ($y$) is applicable to an external temperature of plus 15° centigrade, it here being assumed that the initial acceleration is about 100 $g$, and the third curve ($z$) applies in the case of an external temperature of plus 50° centigrade (initial acceleration about 200 $g$). The "safe flight" distance is indicated for each of these curves for two different settings of the inertia switch I and are given by the points $x_1$, and $x_2$ and $y_1$, $y_2$ and $z_1$, $z_2$ respectively. It is evident from the diagram that the points $x_1$, $y_1$ and $z_1$ related to a particular setting of the switch I all correspond to about the same "safe flight" distance of approximately 50 metres, despite the very different external temperatures, whilst the points $x_2$, $y_2$, $z_2$, corresponding to a second setting of the switch I, give a "safe flight" distance of about 100 metres.

The main switch which, preferably, incorporates the three individual switches IIa, IIb, and IIc (see the diagram of Figure 1) and the primer for operating them in a single switch housing, is illustrated in more detail in Figures 5 to 8. All the parts of this switch are contained in a metal tube 15. The lower end of this metal tube is closed by a non-conducting plug constituting a contact supporting plate 16 of plastic material which carries two contact pairs 17a, 17b and 18a, 18b at its inner side, one of these contact pairs being associated with the switch IIa and the other with the switch IIb. A switch plate 19 of insulating material rests in the upper part of the contact plate 16 and has two contact pins 20 inserted therein. These contact pins project upwardly above the switch plate 19 whilst their lower ends are flush with the lower surface of the plate 19. As long as the plate 19 with the upwardly-projecting pins 20 is disposed in the contact plate, these pins 20 provide no contact between the contacts 17a, 17b and 18a, 18b. Located above the switch plate 19 in the cylinder 15 is a piston 21 of non-conducting material, for example of synthetic resin. This piston has a shear flange 22 at its upper end whereby it bears on a shoulder 23 provided inside the sleeve 15. The upper end of the sleeve 15 is closed by a plug 24 in which the primer Z is mounted. Moreover a contact ball 25 is provided in the plug 24 this bearing at one side against a spring contact 26 and at the other side engaging in a recess 27, formed in the upper part of the piston 21, when the latter is in its zero position as shown, the position of this piston being so arranged that the ball 25, when located in this recess, simultaneously makes contact both with the spring contact 25 and with the wall of the sleeve 15. This ball forms the switch IIc. In the starting or rest position of the main switch concerned, IIc is therefore closed; in contrast the contacts 17a, 17b and 18a, 18b associated with the switches IIa and IIb are separated. When the primer Z is exploded the shear flange 22 of the piston 21 is broken and the piston propelled downwards. It meets the upstanding ends of the contact pins 20 and drives one of these between the contacts 17a, 17b and the other between the contacts 18a, 18b, which means that the switches IIa and IIb are closed. At the same time switch IIc is opened since the ball 25 breaks contact with the contact 26.

The striker pin with the double contacts A, B (see Figure 1) is illustrated in detail in Figure 9. The housing of the pin assembly is designated 28 in this figure; this housing is covered in the usual way at the end by a diaphragm 29. This diaphragm is firmly connected to a striker pin 30. In the rest position, and with the fuse undamaged, the diaphragm holds the lower end of the striker pin 30 in the immediate vicinity of, but at a small distance from, a contact plate 31 which is biassed by a pre-stressed spring 32 and held in its inoperative position by a sleeve 34, for example of plastic, provided with a shear rim 33, this shear rim resting on the upper edge of a sleeve 37 of insulating material firmly mounted in the housing 28. Located beneath the plate 31, and arranged one behind the other, are a lateral contact spring 35, constituting one of the contacts A (see Figure 1), and a central contact 36 constituting one of the contacts B (see Figure 1). These contacts 35, 36 are insulated from the housing 28 and from one another by the said sleeve 37.

To secure the contact plate 31 to the plastic sleeve 34 the plate is provided with a collar 38, the upper end of this collar being flanged over. The contact plate 31 is connected by the spring 32 in electrically conducting fashion with the housing 28.

When the fuse is undamaged, the striker pin 30 is driven inwards as a result of the missile hitting a target, whereby the collar 33 of the sleeve 34 is sheared off to enable the spring 32 to drive the contact plate 31 downwards, so that the contact plate passes by the contact 35, short circuits the resistance $R_3$, and causes the explosion of the detonator D. If, in contrast, the fuse has already been damaged before the condenser $C_1$ has been charged and/or the fuse armed, the pin 30 has already sheared the collar 33, as a result of this damage, and the spring 32 has forced the contact plate 31 down and applied it against the contact 36. The passage past the contact 35 resulting from this last-mentioned movement is ineffective so long as the storage condenser $C_1$ is not charged or is not connected to the internal firing circuits. The contacts B are closed as a result of the application of the contact plate 31 against the contact 36, and the condenser $C_1$ consequently short circuited.

The advantages of the electrical fuse described above should be sufficiently clear from the above description. Briefly stated they are as follows:

(1) Very considerable safety against any accident before firing of the missile and until the missile has travelled the requisite "safe flight" distance.

(2) Simple construction of the whole fuse assembly and particularly of the self-destruction mechanism, which largely employs individual parts which are generally to be found in fuses for other purposes.

As will be understood, the invention is not limited to the embodiments which have been described in detail above, but includes numerous modifications within the scope of the appended claims.

What I claim is:

1. An electrical fuse for a rocket missile, comprising a storage condenser, means for charging the condenser during the firing cycle of the missile, internal firing circuits, a main switch for connecting said condenser to said circuits to arm the fuse, an electrically ignitable explosive charge capable when ignited of operating said switch and an inertia switch responsive to the acceleration of the missile upon firing thereof to send current from said storage condenser through said charge so as to ignite it and further including a second condenser inserted in series between said storage condenser and said charge, such second condenser having a capacity of the order of one tenth of that of the storage condenser.

2. The electrical fuse of claim 1 including a high value resistance shunting said second condenser.

3. An electrical fuse for a rocket missile, comprising a storage condenser, means for charging the condenser during the firing cycle of the missile, internal firing circuits, a main switch for connecting said condenser to said circuits to arm the fuse, an electrically ignitable explosive charge capable when ignited of operating said switch and an inertia switch responsive to the acceleration of the missile upon firing thereof to send current from said storage condenser through said charge so as to ignite it, said main switch comprising a cylindrical housing, a plug closing one end of said housing, a piston slidable in said cylindrical housing, said explosive charge being mounted between said plug and said piston, a plate closing the other end of said housing, two pairs of spaced contacts on said plate, a shear flange on said piston holding the latter in a rest position adjacent to said plug and contacts mounted between said housing and said piston so as to be held closed by said piston when in its rest position and controlling the charging means for said storage condenser, said charge being electrically fired under the control of said inertia switch by current drawn from said storage condenser thereby to drive said piston towards said plate and close the pairs of contacts carried thereby whilst opening said charging circuit-controlling contacts.

4. The electrical fuse of claim 3, in which said main switch includes a switch plate adjacent to said plate and between the latter and said piston, and a pair of contact pins held by said switch plate and projecting towards said piston to be engaged by the latter and driven between said pairs of contacts to close same when the piston is driven towards the contact plate by firing of said explosive charge.

5. The electrical fuse of claim 4, in which said charging means controlling contacts comprise a spring contact carried by said plug, the wall of said housing and an intermediate electrically conductive body held by the piston, when in its said rest position, in engagement with said spring contact and said housing wall and released from such engagement when the piston is driven from its rest position.

6. An electrical fuse for a missile, comprising: a storage condenser adapted to be charged during the firing cycle of the missile; internal firing circuits including, in series, one terminal of said storage condenser, a resistance, a thyratron with its cathode connected to said resistance, and an electrical detonator having one terminal connected to the thyratron anode, an auxiliary condenser, having a capacity less than that of the storage condenser, connected across the second detonator terminal and the thyratron cathode; means for arming the fuse by connecting said second detonator terminal to the other terminal of said storage condenser, after the missile has been fired; and a fuse-initiating element for short-circuiting said resistance to cause, when the fuse is armed, striking of the thyratron and explosion of said detonator.

7. The electrical fuse of claim 6, including a voltage divider connected, when the fuse is armed, across the storage condenser to provide a bias potential for the grid of the thyratron.

8. The electrical fuse of claim 6, in which said means for arming the fuse comprise an inertia switch including a cylinder and a piston movable therein from an initial position to a second position by acceleration forces acting on such piston during the initial flight of the missile, said piston, in its second position, arming the fuse and said cylinder containing a fluid having a viscosity substantially unaffected by temperature changes in a range within which a substantially constant "safe flight" distance is required.

9. An electrical fuse for a missile, comprising a storage condenser, means for charging the condenser during the firing cycle of the missile, internal firing circuits, an inertia switch responsive to the acceleration of the missile when fired for connecting said condenser to said circuits to arm the fuse after a period determined by the speed of operation of said inertia switch, an electrical detonator connected with said firing circuits, a fuse initiating device including two sets of contacts, means operable upon impact for closing said sets of contacts, one of said sets of contacts being connected with said firing circuits so that its closing causes said detonator to be operated by current supplied from said storage condenser, but only if the fuse is armed, and the other of said sets of contacts being connected to the terminals of said condenser, when said fuse is not armed.

10. An electrical fuse for a missile, comprising a storage condenser, means for charging the condenser during the firing cycle of the missile, internal firing circuits, an inertia switch responsive to the acceleration of the missile when fired for connecting said condenser to said circuits to arm the fuse after a period determined by the speed of operation of said inertia switch, an electric detonator connected with said firing circuits, a fuse initiating device including two sets of contacts, means operable upon impact for closing said sets of contacts, one of said sets of contacts being connected with said firing circuits so that its closing causes said detonator to be operated by current supplied from said storage condenser, but only if the fuse is armed, and the other of said sets of contacts being connected to the terminals of said condenser, when said fuse is not armed, said fuse initiating device comprising a contact plate constituting the first contact of each of said sets thereof, a spring urging said contact plate towards two separate contacts constituting the second contacts of said sets thereof, means retaining said contact plate spaced from said contacts and means for releasing said retaining means so that said spring moves the contact plate into engagement with the first one and then the other of said contacts, the latter contact being the second contact of said set connected to the terminals of said storage condenser.

References Cited in the file of this patent

UNITED STATES PATENTS

| | | |
|---|---|---|
| 2,236,958 | Mathison | Apr. 1, 1941 |
| 2,404,553 | Wales | July 23, 1946 |
| 2,514,434 | Windes | July 11, 1950 |
| 2,545,474 | Kurland et al. | Mar. 20, 1951 |
| 2,712,791 | Bleakney et al. | July 12, 1955 |

FOREIGN PATENTS

| | | |
|---|---|---|
| 101,601 | Sweden | May 13, 1941 |
| 1,002,833 | France | Nov. 7, 1951 |